Figure 1:
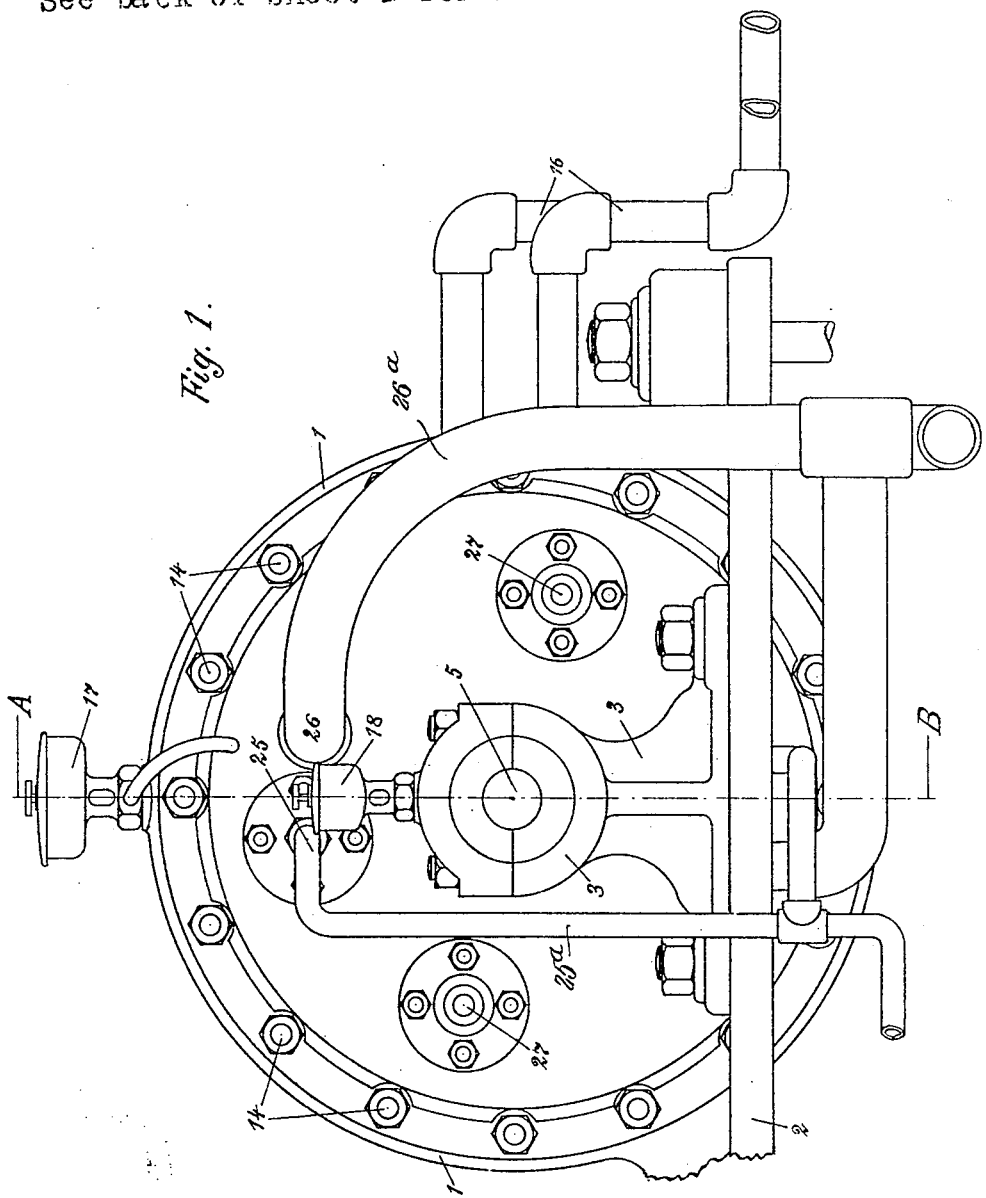

123. INTERNAL COMBUSTION ENGINES,
Rotary, Swinging abutment.

No. 819,990. PATENTED MAY 8, 1906.
F. H. GRAWERT-ZELLIN.
EXPLOSION TURBINE.
APPLICATION FILED NOV. 19, 1904.

6 SHEETS—SHEET 1.

See back of sheet 1 for refs.

Witnesses: Inventor:
Fritz H. Grawert-Zellin

No. 819,990. PATENTED MAY 8, 1906.
F. H. GRAWERT-ZELLIN.
EXPLOSION TURBINE.
APPLICATION FILED NOV. 19, 1904.
6 SHEETS—SHEET 2.
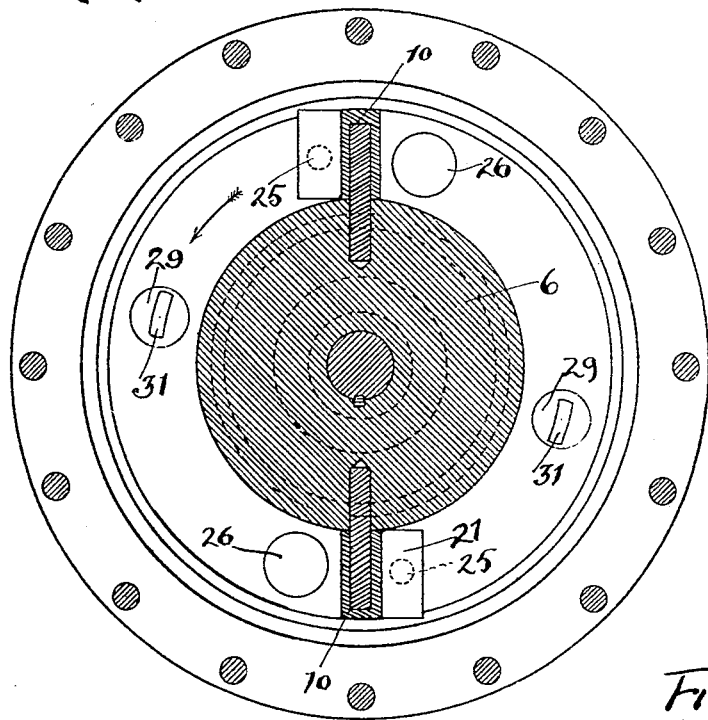
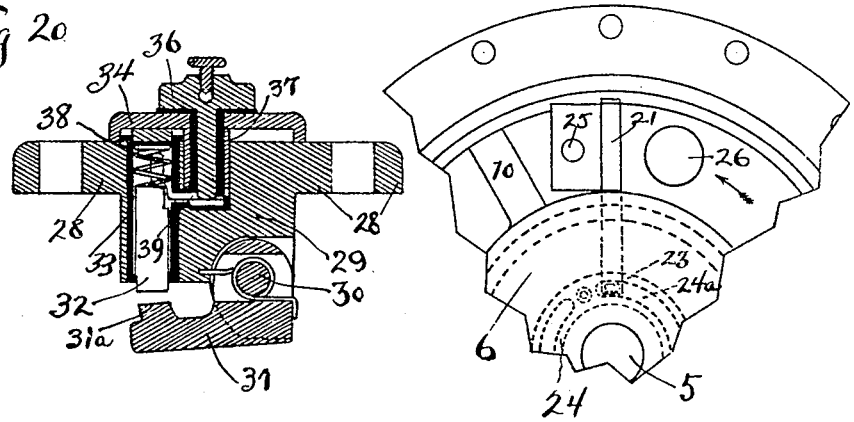
Witnesses
Inventor
FRITZ H. GRAWERT-ZELLIN.
By his Attorneys
Knight Bros No. 819,990. PATENTED MAY 8, 1906.
F. H. GRAWERT-ZELLIN.
EXPLOSION TURBINE.
APPLICATION FILED NOV. 19, 1904.
6 SHEETS—SHEET 3.
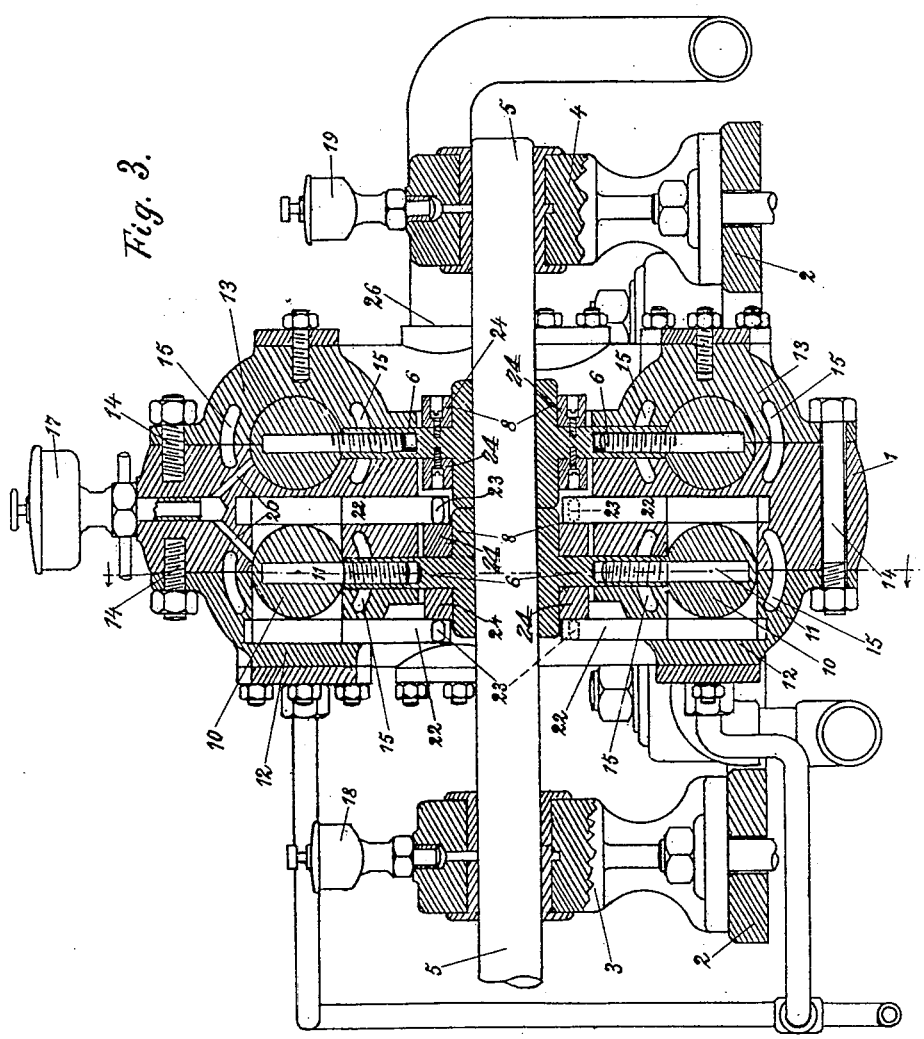

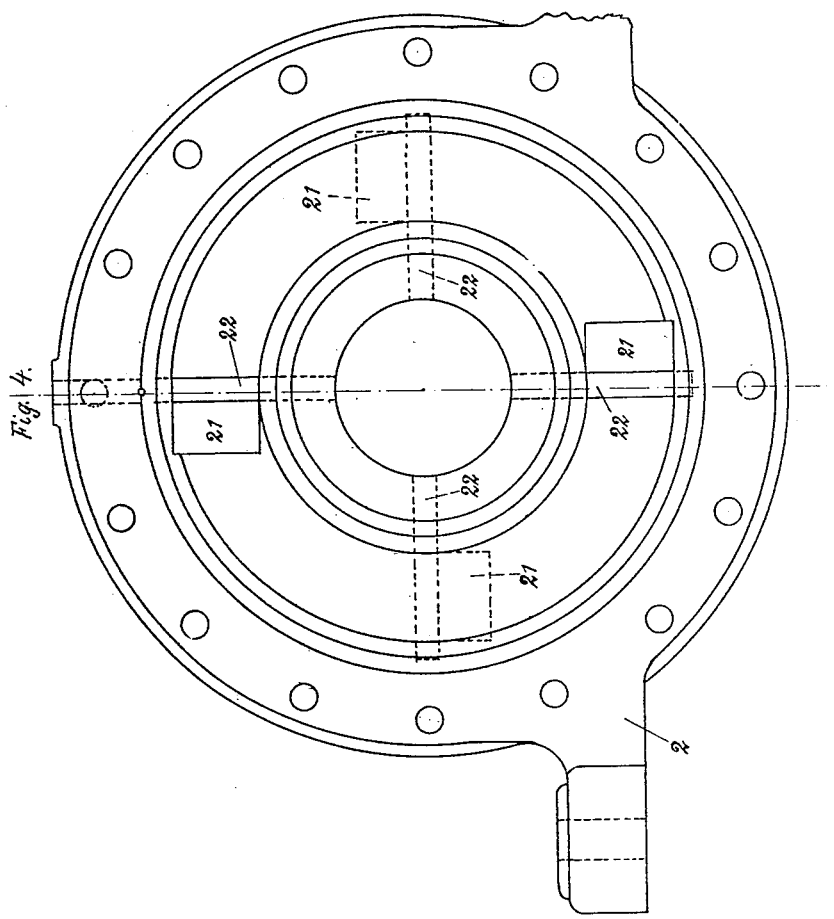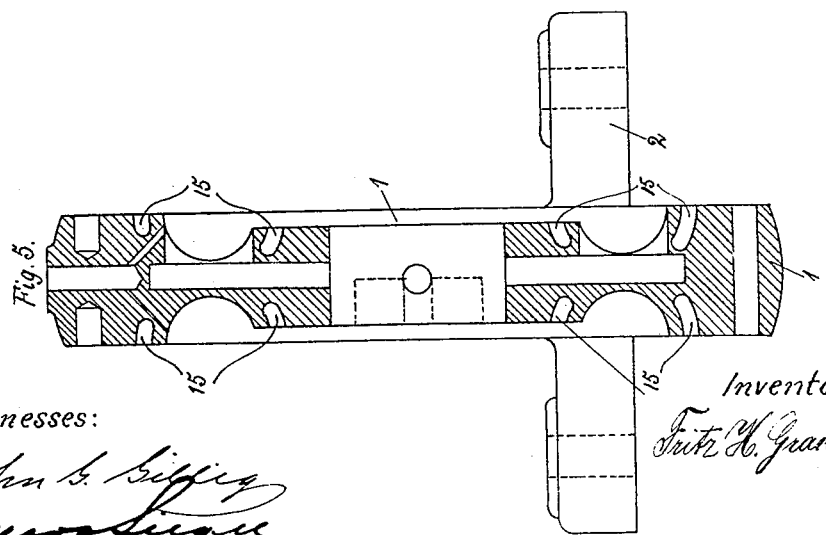

No. 819,990. PATENTED MAY 8, 1906.
F. H. GRAWERT-ZELLIN.
EXPLOSION TURBINE.
APPLICATION FILED NOV. 19, 1904.

6 SHEETS—SHEET 5.

Witnesses:

Inventor:
Fritz H. Grawert-Zellin

Rotary, Swinging abutment.
No. 819,990. PATENTED MAY 8, 1906.
F. H. GRAWERT-ZELLIN.
EXPLOSION TURBINE.
APPLICATION FILED NOV. 19, 1904.
6 SHEETS—SHEET 6.
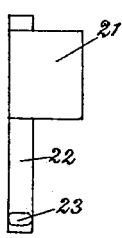
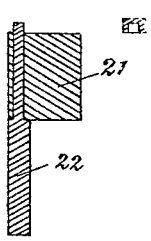
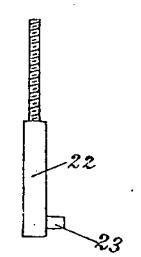
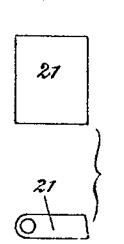
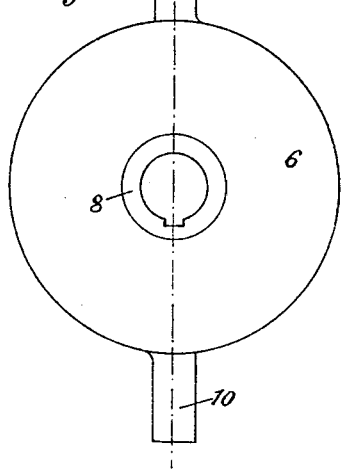
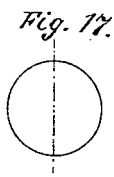
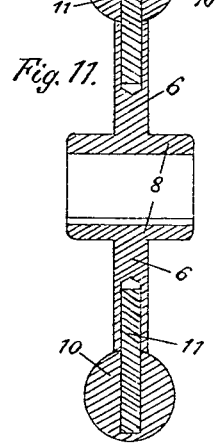
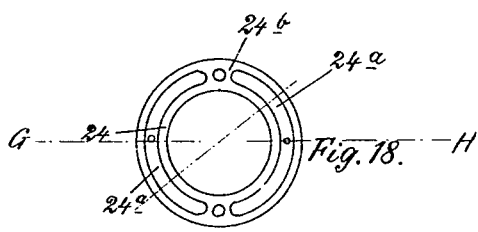
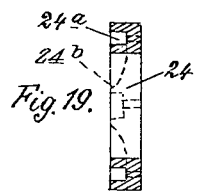
Witnesses: Inventor:
Fritz H. Grawert-Zellin

UNITED STATES PATENT OFFICE.

FRITZ H. GRAWERT-ZELLIN, OF NEW YORK, N. Y.

EXPLOSION-TURBINE.

No. 819,990.      Specification of Letters Patent.      Patented May 8, 1906.

Application filed November 19, 1904. Serial No. 233,398.

*To all whom it may concern:*

Be it known that I, FRITZ H. GRAWERT-ZELLIN, a subject of the German Emperor, and a resident of the city, county, and State of New York, have invented certain new and useful Improvements in Explosion-Turbines, of which the following is a clear and exact description, enabling others skilled in the art to understand and use the same.

My invention relates to that class of engines in which the power medium directly acts upon a piston secured to the driving-shaft, and more particularly to a rotary engine operated by an explosive power medium.

My object in arranging the cylinder of such explosion-engine in angular form concentric to the driving-shaft and the pistons securely mounted thereon to travel in this annular cylinder is to utilize the explosive pressure of the gases to full advantage and to simultaneously employ the fly-wheel momentum of said pistons in assisting in the rotary motion. In this way the explosive pressure acts not only with a certain leverage directly upon the shaft, thus lessening the jar and friction otherwise produced in cross-heads, bearings, &c., but also insures a uniform and constant revolution, there being no dead-centers or other resistances to be overcome, such as frequently occur in the operation of reciprocating engines.

In the present form of my invention I provide two such annular cylinders with two pistons, each set at an angle of one hundred and eighty degrees, the pistons in both cylinders being arranged in the same plane, while the position of the gas inlet and exhaust openings and the sparking devices in one of the cylinder-heads are set under an angle of ninety degrees to the openings and sparking devices in the opposite cylinder-head, so as to give an impulse at every quarter of a revolution of the shaft.

Figure 6:
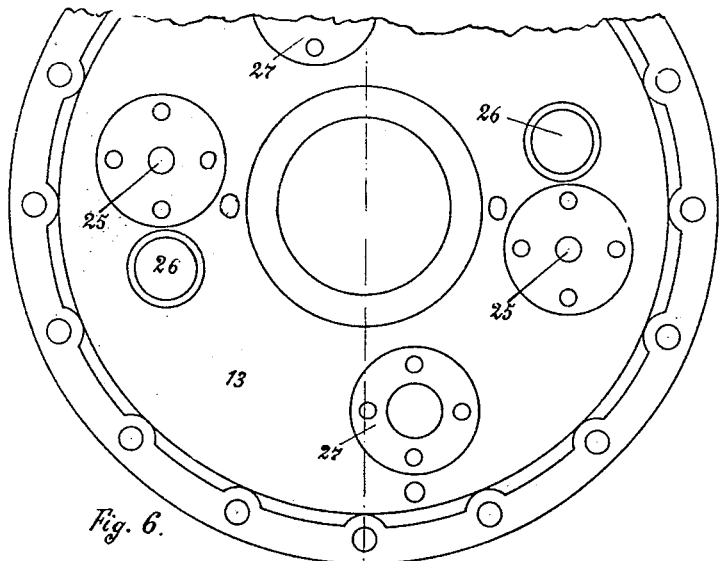
Figure 7:
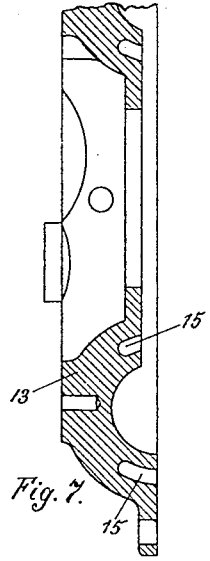
Figure 8:
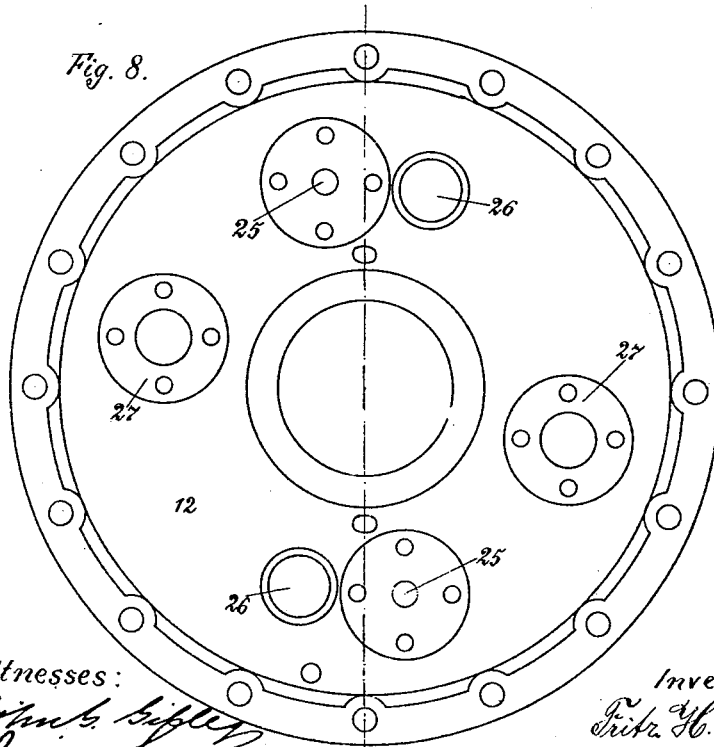
Figure 9:
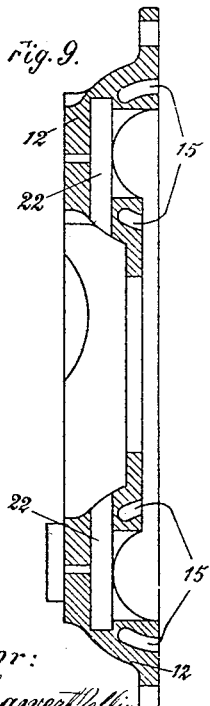

In the accompanying drawings, Figure 1 is a side view of the engine, showing the inlet and the outlet of the pressure medium and of the medium for cooling the cylinders and pistons. Fig. 2 is a section through Fig. 3 on the line between the left-hand head and the center portion of the motor structure looking toward the left of said figure. Fig. 2ª is a side view of the upper part of Fig. 2, the piston and disk being shown in full and in shifted position. Fig. 3 is a section on line A B of Fig. 1. Fig. 4 is a detail side view of the central body portion of the annular cylinders. Fig. 5 is a cross-section on line C D of Fig. 4. Figs. 6 and 7 are side view and longitudinal section, respectively, of the cover-plate of the cylinder seen in Fig. 1. Figs. 8 and 9 are side view and longitudinal cross-section, respectively, of the cover-plate of the cylinder on the opposite side of that one shown in Figs. 6 and 7. Figs. 10 and 11 are detail side view and longitudinal section, respectively, of one of the disks carrying the pistons. Figs. 12, 13, 14, 15 are detail illustrations of the valves or traps forming an abutment for the explosion of the power medium after the passage of the pistons. Figs. 16 and 17 are detail side view and front view of the piston. Fig. 18 shows a detailed side view of a ring concentrically secured on each side of the piston-disks. Fig. 19 is a section on line G H, Fig. 18. Fig. 20 is a section through one of the sparking devices secured to the cylinder-heads and projecting through suitable borings into the cylinders.

Referring to the drawings, 1 is the central body portion of the annular cylinders, having cast integrally therewith a base-plate 2, upon which at both sides of said central portion bearings 3 and 4 are mounted, so as to carry the main driving-shaft 5. The piston-disks 6 6 are secured to their shafts 8 8, and carry each at two points diametrically opposite the pistons 10 by means of screw-bolts 11.

As can be seen from Fig. 3, the pistons in the two cylinders on both sides of the central body portion 1 are mounted in the same position upon the driving-shaft 5. The cover-plates 12 and 13 on both sides of the central body portion 1 are secured thereto by screw-bolts 14. The walls of these annular cylinders are provided with water-jackets 15, through which by means of pipes 16, leading to a separate pump, (not shown,) water is circulated for cooling. Each of the bearings for the main driving-shaft have a lubricator 18 and 19, respectively. A larger lubricator 17 is placed at the highest point of the central body portion 1 and lubricates both cylinders through separate pipe connections and through channels 20.

The valves or abutments forming with the pistons the explosion-chambers consist of traps 21, swinging upon supporting-pivots 22 on both sides of each cylinder, said supports being radially arranged to the main driving-shaft and having at their inner ends lateral projections 23, which engage with curved recesses 24ª of rings 24, two of which are screwed onto each of the piston-disks 6 6 and close to the hubs 8 8 of the latter, Figs. 3, 18, and 19. These traps 21 are provided at two points diametrically opposite in each annular cylinder. Near to both sides of each of the traps 21 in the outer cover-plates 12 13 of the cylinders are the inlet and exhaust openings 25 26 for the inlet and exhaust pipes 25$^a$ and 26$^a$, respectively, for the explosive medium and the exhaust-gases, and the recess 24$^a$ of the rings 24 is of such length only as to actuate the projections 23 of the trap supports or pivots 22 shortly prior to the passing of the piston 10. Normally, therefore, the traps 21, two of which are oppositely hinged and coöperating, are closed—that is, in their position across the cylinder—the lateral projections 23 resting in the circular groove or recess 24$^a$, Figs. 18, 19, and 2$^a$. The latter is interrupted at two points diametrically opposite by a cam projection or surface 24$^b$, Figs. 18 and 19, upon which the lateral projection 23 rides and by the turn of pivot 22 opens the traps for the passage of the piston. As soon as the piston has passed the traps will be closed again by a suitable spring (not shown) acting upon the traps or their pivots, the lateral projections 23 entering again the curved recess 24$^a$. To secure a tight closure of these traps when the explosion occurs in the so-formed chamber between the piston and traps, the contact-faces of the latter may be chamfered, so as to increase the pressure with which these faces rest against each other by the pressure of the power medium, thus insuring a tight closure.

The sparking devices 27, Fig. 1, are placed within the annular cylinders at a certain distance from the inlet-openings 25. Each of these sparking devices 27 (see Fig. 20) consists of a plate 28, having integral and concentric therewith a cylindrical projection 29, with a suitable recess for holding a pivot 30, which serves as bearing-point for a short lever 31, with an inwardly-projecting contact-piece 31$^a$. Opposite this contact-piece 31$^a$ projects a carbon rod 32 from a boring in parts 28 29, but insulated therefrom by a porcelain tube 33. It is held in this position by an insulated spring 38, confined between its inner end and a plate 34, secured to the parts 28 29, with its centrally-projecting tubular part 37. The electrical connection between one pole of a circuit and this carbon rod 32 (the other pole to be connected to any part of the engine) is made by means of an insulated screw 36, the inner end of which is electrically connected with the carbon 32 by a flexible wire embedded in an insulated recess 39.

The operation is as follows: When the engine is started in any suitable manner, the explosive mixture is drawn into the chamber formed between the closed abutments or traps 21 and the piston 10 as soon as the latter has passed the inlet-opening of 25. These openings may be closed by any suitable check-valve, preferably a ball-valve, (not shown,) so that the gases will only enter when their pressure is higher than the pressure within the cylinder. Thus the explosion will automatically check further gas-supply. The explosion occurs as soon as the piston has passed the sparking device 27 and the lever 31 and slightly projects with its free end into the path of the piston, and thus brings together the two contact-pieces 31$^a$ 32. Spring-pressure breaks this contact and forms the spark. At the end of half a revolution the spent gases escape through opening 26, the diametrically opposite piston 10 serving for sweeping the cylinder clear.

Having thus described my invention, what is claimed as new, and desired to be secured by Letters Patent, is—

In a machine of the character described, the combination of an annular cylinder of substantially circular cross-section, rotary pistons in said cylinder, a main driving-shaft and a circular disk mounted thereon and supporting said pistons inlet and exhaust openings in the wall of said cylinder for the explosive power medium and the exhaust-gases oppositely hinged and coöperating traps forming an explosion-chamber in conjunction with said pistons, lateral projections at the hinges of said traps, rings mounted upon the main driving-shaft having circular grooves engaging said lateral projections when the traps are in closed position and cam projections interrupting said grooves and actuating said lateral projections so as to open said traps shortly prior to the passage of the pistons and sparking devices within said cylinder for igniting the explosive mixture, substantially as described.

FRITZ H. GRAWERT-ZELLIN.

Witnesses:
C. VON GRUEBER,
H. POTH.